(12) United States Patent
Koenig

(10) Patent No.: US 6,375,237 B1
(45) Date of Patent: Apr. 23, 2002

(54) ERGONOMICS GRASPING TOOL

(76) Inventor: Larry D. Koenig, Box 1037, Williamsburg, IA (US) 52361

( * ) Notice: Subject to any disclaimer, the term of this patent is extended or adjusted under 35 U.S.C. 154(b) by 0 days.

(21) Appl. No.: 09/825,970

(22) Filed: Apr. 4, 2001

(51) Int. Cl.[7] .................................................. B65G 7/12
(52) U.S. Cl. .......................................... 294/16; 294/28
(58) Field of Search ........................... 294/15, 16, 27.1, 294/28, 29, 31.1, 25, 61, 99.2, 104, 106, 902

(56) References Cited

U.S. PATENT DOCUMENTS

| | | | |
|---|---|---|---|
| 1,514,203 A | * 11/1924 | Dexheimer | 294/25 |
| 2,210,904 A | * 8/1940 | Durant | 294/16 X |
| 2,860,000 A | * 11/1958 | Marcheski | 294/28 |
| 3,041,101 A | * 6/1962 | Lebre | 294/16 X |
| 4,707,011 A | * 11/1987 | McKim | 294/16 |
| 5,871,242 A | * 2/1999 | Whitney | 294/16 |
| 6,065,788 A | * 5/2000 | Brady | 294/16 X |

FOREIGN PATENT DOCUMENTS

DE 811699 * 8/1951 ................. 294/16

* cited by examiner

*Primary Examiner*—Johnny D. Cherry
(74) *Attorney, Agent, or Firm*—Allan L. Harms

(57) ABSTRACT

A grasping tool for a corner of a box or carton includes a pair of plates joined at a hinge element which is spring loaded to cause the plates to return to a rest position. A lever is fixed to each plate such that the levers may separate the plates about the hinge axis against the load of the spring of the hinge. Each plate includes tangs which will penetrate the outer skin of a carton to which the grasping tool is to be temporarily fixed.

12 Claims, 4 Drawing Sheets

ERGONOMICS GRASPING TOOL

STATEMENT REGARDING FEDERALLY SPONSORED RESEARCH OR DEVELOPMENT

Not Applicable.

BACKGROUND OF THE INVENTION

This invention pertains to the manual handling of bulky packages and provides a grasping tool or clamp which is detachably mountable to a box to be carried by the user.

Frequently, a package handler confronts a large cardboard box or other package, which, though not being too heavy to carry, is difficult to handle due to its size. In addition, persons wishing to carry smaller boxes must employ both hands to carry such packages unless such a package is of small enough dimension to be grasped between the thumb and remaining fingers of one hand. A need exists for a device which may be temporarily fixed to a box or other package which permits it to be easily attached and detached and which permits the box to be lifted with only one hand. In addition, a device is needed which affords a tool to temporarily grasp any corner of a box or multiple corners simultaneously to make transport of such a large box a simple task.

SUMMARY OF THE INVENTION

A grasping tool for a corner of a box or carton to be transported allows temporary attachment of the grasping tool to the box or carton by use of a single hand of the user. A pair of plates is joined at a hinge element which is spring loaded to cause the plates to return to a rest position. A lever/handle is fixed to each plate such that the lever/handles may be manually moved one toward the other to force the plates to separate about the hinge axis against the load of the spring of the hinge.

Each plate has an inner face which when the grasping tool is at rest, opposes the inner face of the other plate. The inner faces of each plate include tangs or projections which will penetrate the outer skin of a carton to which the grasping tool is to be temporarily fixed. The user may force the plates of the grasping tool into an oblique separation between them such that one inner face of the grasping tool opposes a first sidewall of the carton while the inner face of the other plate opposes a second sidewall of the carton which is perpendicular to the first sidewall and adjacent thereto. The user having positioned the grasping tool at a corner of the carton, may allow the grasping tool to close to engage the adjacent orthogonal sidewalls of the carton with the tangs of the inner faces of the grasping tool slightly penetrating the outer skin of the carton. The user may then grasp a single one of the lever/handles to lift the carton. The user may later easily remove the grasping tool by forcing together the respective lever/handles extending from the plates to separate the plates and release the grasping tool from the carton.

It is an object of the invention to provide an easily attachable grasping tool for grasping a carton or box at a corner thereof.

It is another object of the invention to provide an inexpensive hand tool which may be used alone or in pairs to assist in the handling of cardboard boxes or cartons or other packages having generally soft or penetrable sidewalls.

It is a further object of the invention to provide a hand tool which reduces the likelihood of injury to a user lifting cartons, boxes and other large objects.

It is still a further object of the invention to provide a useful hand tool which may be operated with one hand to effectively grasp a carton and to be disconnected from the carton by use of a single hand of the user.

These and other objects of the invention will become apparent from examination of the description and claims which follow.

BRIEF DESCRIPTION OF THE SEVERAL VIEWS OF THE DRAWING(S)

DETAILED DESCRIPTION OF THE INVENTION

Figure 1:
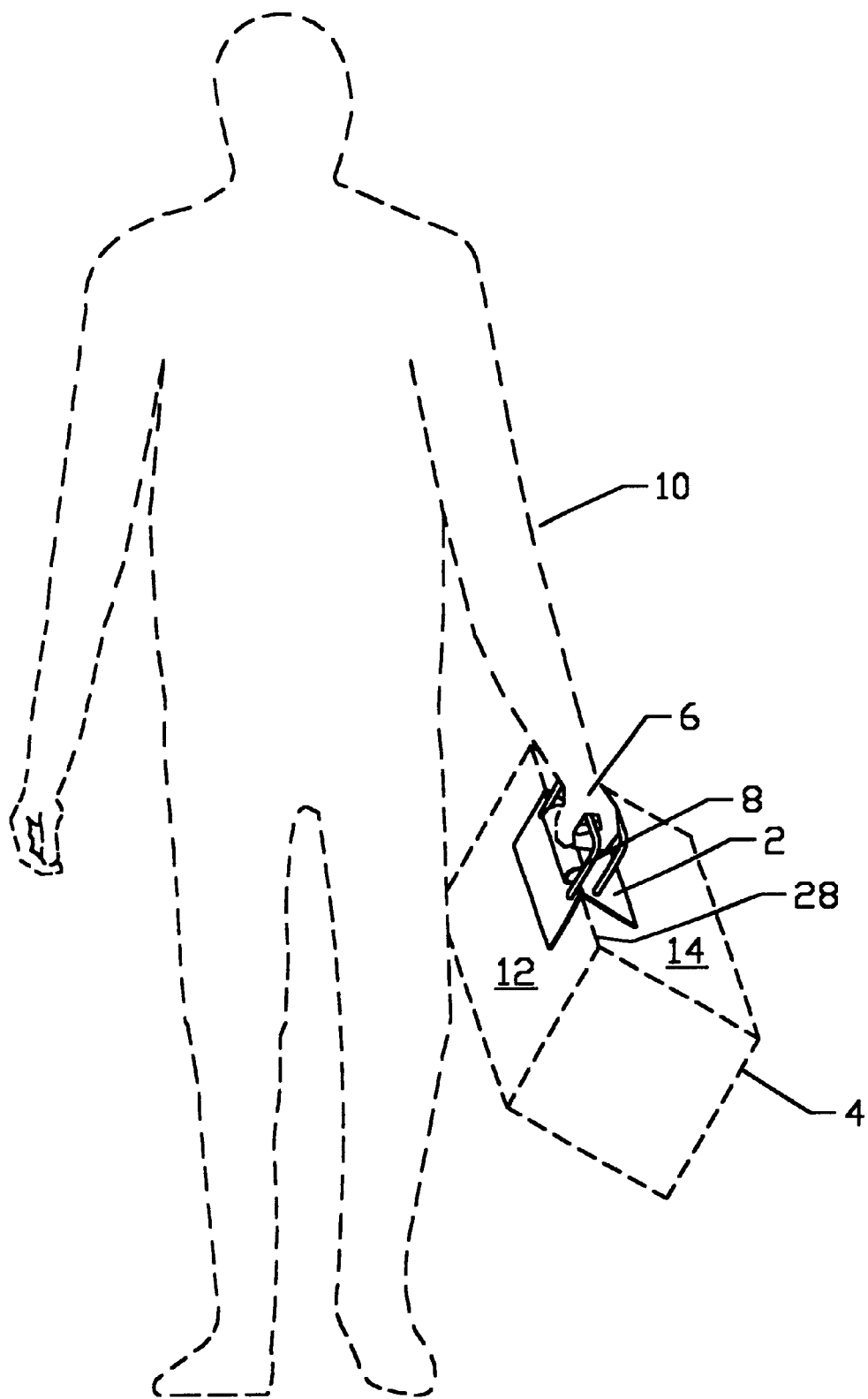
FIG. 1 is a front perspective view of a user carrying the grasping tool invention attached to a carton.

In FIG. 1 a user 10 is shown using grasping tool invention 2 to lift and carry a carton 4 with one hand 6 of user 10. The grasping tool 2 is fixed to adjacent orthogonal sides 12, 14 of carton 4 at corner 28. The hand 6 of user 10 is suspending grasping tool 2 by first handle 8 thereof.

Figure 2:
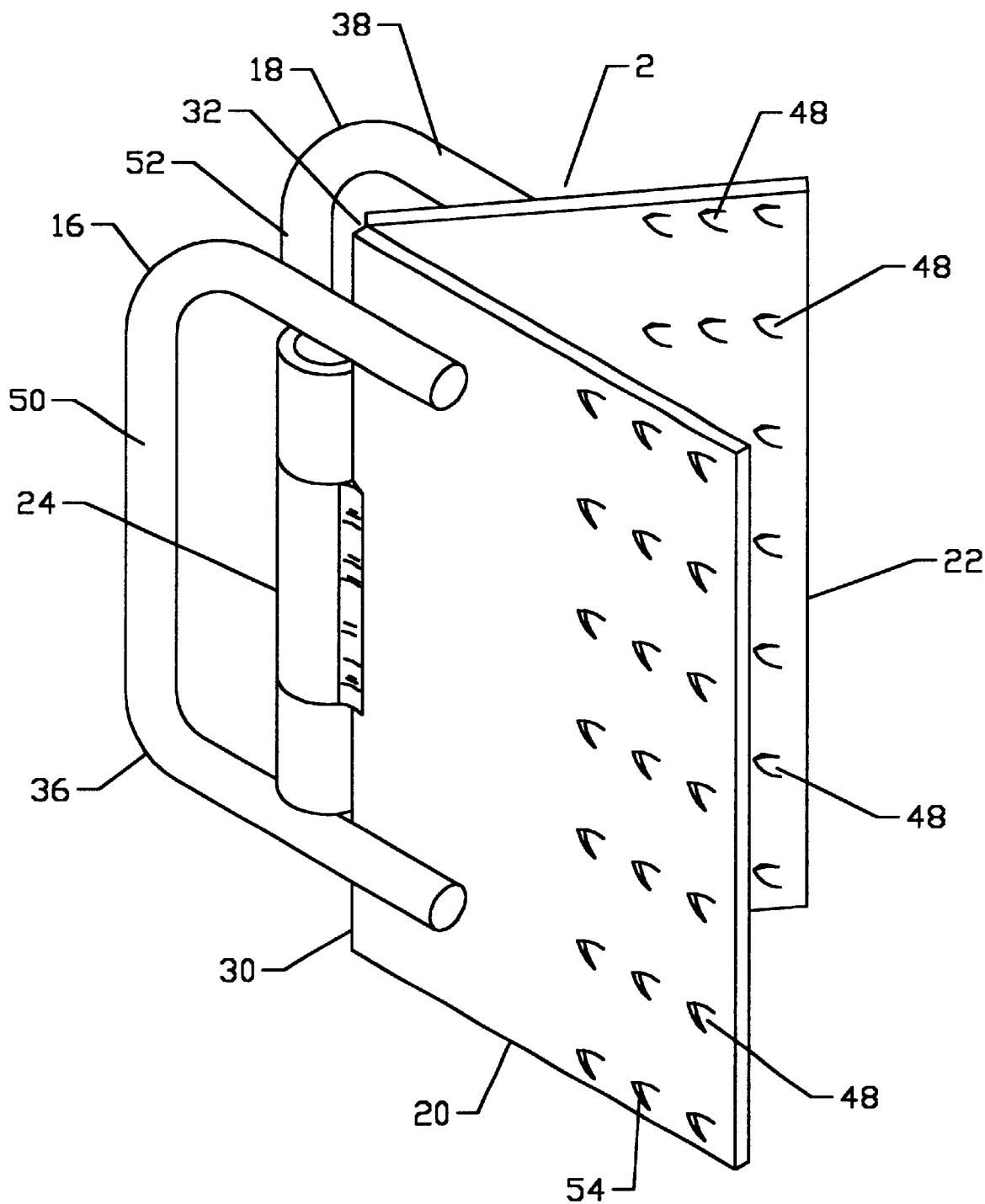
FIG. 2 is a perspective view of the grasping tool invention in its rest position.
Figure 4:
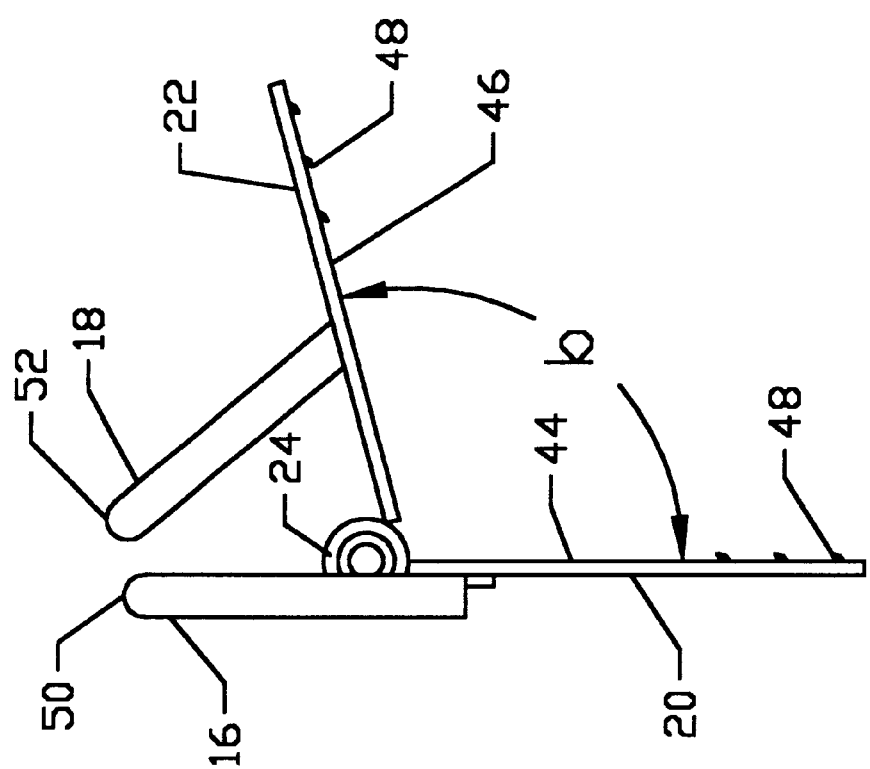
FIG. 4 is a side plan view of the grasping tool invention in an open position with the plates thereof urged apart by manual operation of the lever/handles extending from each plate.
Figure 3:
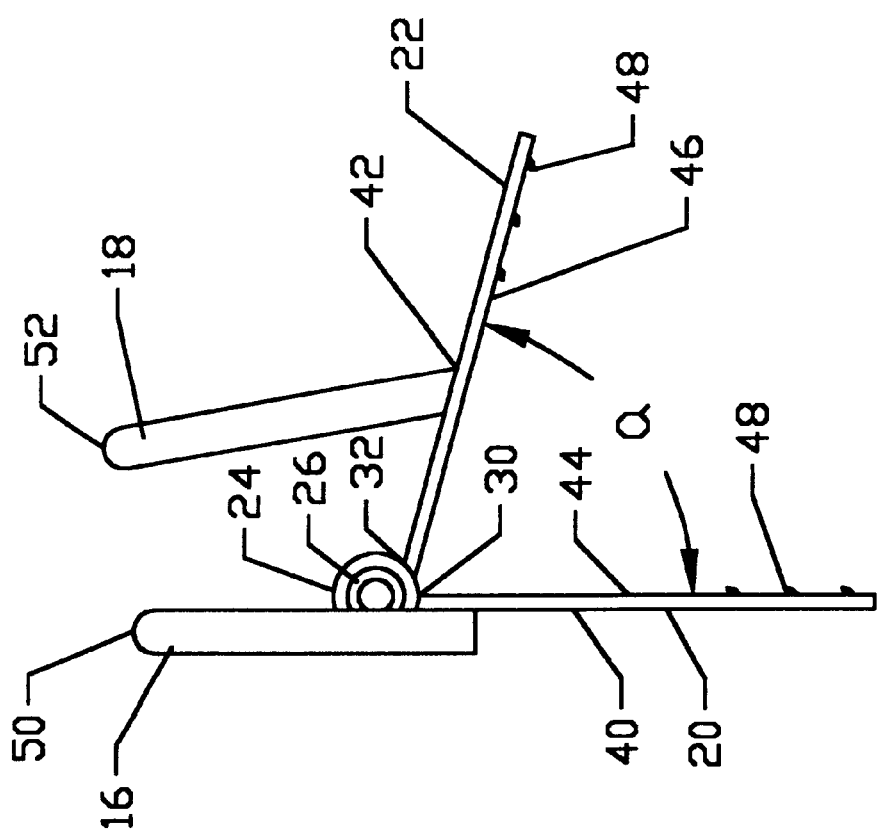
FIG. 3 is a side plan view of the grasping tool invention in its rest position.

Referring now to FIGS. 2, 3, and 4, the grasping tool 2 is illustrated by enlarged views. Grasping tool 2 comprises a pair of plates 20, 22 which are fixed at edges 30, 32 thereof respectively to hinge 24 such that plates 20, 22 define an angle therebetween. Hinge 24 includes a spring 26 which urges plates 20, 22 to rest as shown in FIG. 3 defining an acute angle α of approximately seventy-five degrees therebetween. The separation of plates 20, 22 when grasping tool 2 is at rest is widely variable provided that the angle α is at least acute.

First plate 20 is provided with a handle 16 which extends therefrom generally in parallel with plate 20 past edge 30 of plate 20. First handle 16 is fixed by welding or other permanent means to outer face 40 of first plate 20. First handle 16 comprises a loop 36 through which a user may pass the user's hand to grasp handle 16 upon grip 50 thereof to lift grasping tool 2 and a carton to which it is attached.

Second handle 18 extends from outer face 42 of second plate 22 at an oblique angle thereto such that second handle 18 inclines toward first handle 16 when grasping tool 2 is at rest in its closed position and grip 52 of second handle 18 is spaced apart from grip 50 of first handle member 16 a distance which may be spanned by a user's hand, such that the user may draw grips 50 and 52 toward each other to increase the angular separation between plates 20 and 22 to an angle b of approximately one hundred fifteen degrees as illustrated in FIG. 4. The limit of angular separation of plates 20, 22 is widely variable but the plates must separate more than ninety degrees so the clamp can be applied to or detached from a carton's corner. As a practical consideration, it has been determined that a separation of about one hundred fifteen degrees permits easy attachment and detachment of grasping tool 2 to a carton. Movement of plates 20, 22 about the axis of hinge 24 may be limited in separating rotation such that grips 50 and 52 do not approach each other sufficiently to pinch the tissue of the palm of a user's hand. Conversely, the convergence of plates 20, 22 is limited in the preferred embodiment by the structure of hinge 24 which will not rotate to a position wherein the angle α between plates 20, 22 is less than about seventy-five degrees. However, the angle α between plates 20, 22 is not critical other than for the physical limitation of arranging second handle 18 on second plate 22 to permit it to be reached by a user's hand 6 which is also passing through first handle 16. Further, the angle b of maximum separation of plates 20, 22 is limited only by the abutment of grip 52 on grip 50 when second handle 18 is drawn toward first handle 16.

Each of plates 20, 22 is provided with a population of sharpened projections or tangs 48 2 extending from inner faces 44, 46 respectively of plates 20, 22. Tangs 48 project a small distance from inner faces 44, 46 and preferably incline toward hinge 24. Tangs 48 may be formed by punctures 54 made through plates 20, 22 from the outer faces 40, 42 thereof respectively. Tangs 48 may be substituted with prongs, struts, nails, tacs or other projections extending inwardly from inner faces 44, 46. Alternatively, the inner faces 44, 46 may be coated with a frictional material which will resist sliding movement on the sidewalls of a carton.

Referring additionally to FIG. 1, because the corner 28 of carton 4 will be positioned between plates 20, 22 when they are separated at an angle b greater than ninety degrees, tangs 48 will embed themselves in the outer skin of carton 4 and exert upward force on sidewalls 12 and 14 of carton 4 when first handle 16 of grasping tool 2 is raised.

Figure 5:
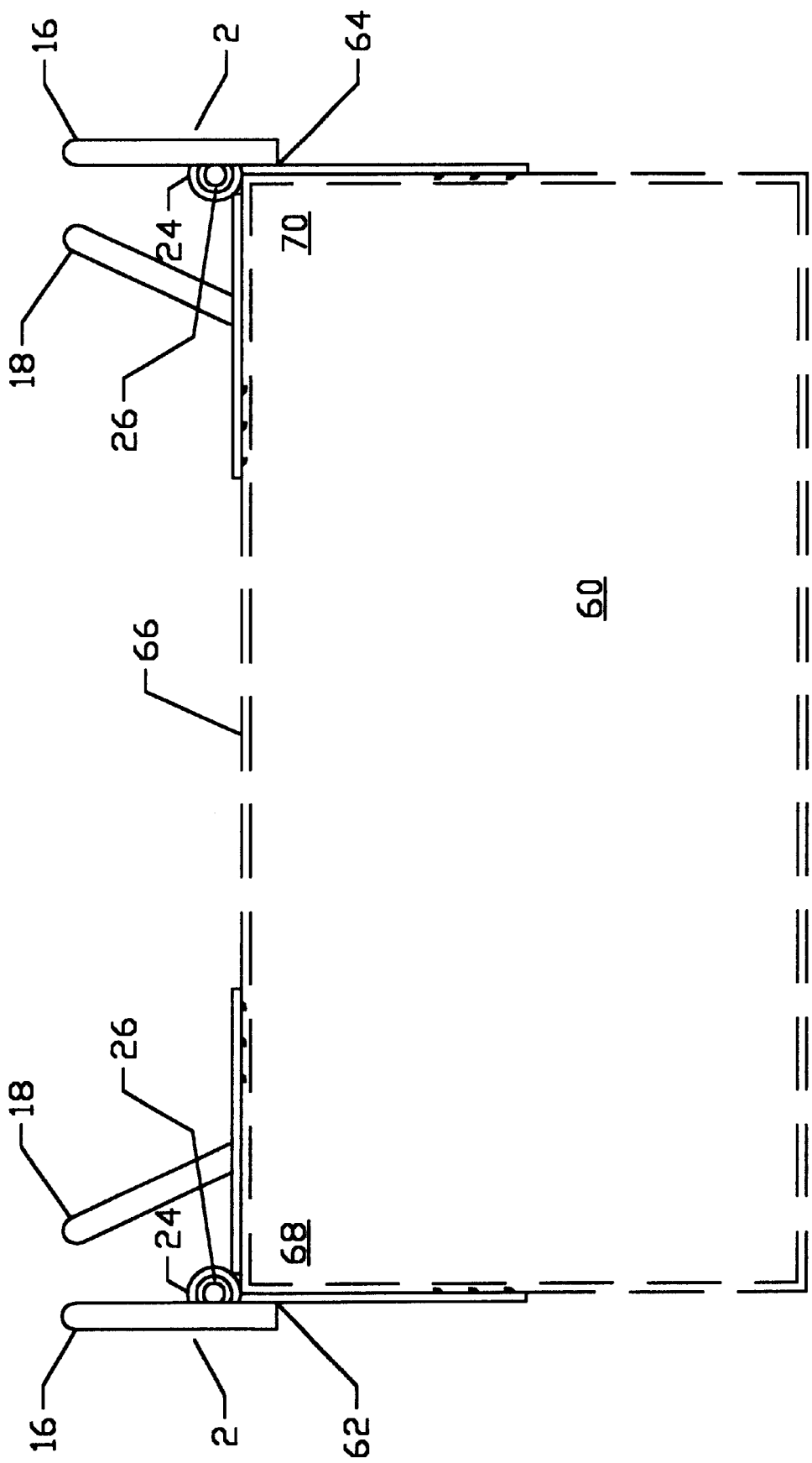
FIG. 5 is a side plan view of a pair of the grasping tool inventions attached to opposing ends of a large carton.

FIG. 5 illustrates the use of a pair of grasping tools 2 employed at opposing ends 62, 64 of elongate box 60 at top 66 thereof. Each grasping tool 2 is attached to an opposing upper corner 68, 70. Lever/handles 16, 18 of each grasping tool 2 have been released by the user and spring 26 of each grasping tool 2 urges first and second plates 20, 22 toward each other pivotally around hinge 24. A user may lift elongate box 60 by placing one hand on each of handles 16 thereby creating a firm grasp on corners 68, 70 of elongate box 60 to manipulate it.

It should be understood that cartons and boxes other than those constructed of cardboard may be moved with use of grasping tool 2 if the outer surfaces thereof are susceptible of embedment of tangs 48 of grasping tool 2.

Having described the invention, I claim:

1. A grasping tool for engaging the corner of an object comprising
   a first plate and a second plate,
   each plate having a first edge,
   the first edges of each of the first and second plates joined to a hinge,
   a spring element urging the hinge to a closed position wherein said first plate is separated by an acute angle from said second plate,
   a first lever fixed to said first plate and extending generally parallel to said first plate past the first edge of said first plate,
   a second lever fixed to said second plate and extending therefrom substantially non-parallel thereto,
   whereby said first plate and said second plate may be urged to angularly separate about said hinge against the urging of said spring element.

2. The grasping tool of claim 1 wherein
   each of said first plate and said second plate has mutually opposing inner faces,
   each inner face of said first plate and said second plate has at least one tang projecting therefrom.

3. The grasping tool of claim 2 wherein
   each of the at least one tang on each of first said plate and said second plate is a projection created by a puncture through said first plate and said second plate.

4. The grasping tool of claim 2 wherein
   said at least one tang is inclined toward said hinge.

5. The grasping tool of claim 1 wherein
   each of said first plate and said second plate has mutually opposing inner faces,
   a multiplicity of sharp projections extends from the inner face of each said of said first plate and said second plate.

6. The grasping tool of claim 1 wherein
   each of said first plate and said second plate has mutually opposing inner faces,
   said inner faces each provided with a frictional surface which will resist sliding movement on a sidewall of a carton.

7. The grasping tool of claim 1 wherein
   said hinge is an elongate cylinder having a first segment and a second segment,
   the first segment axially rotatable relative to the second segment,
   said hinge having a spring mounted therewithin to resist axial rotation of said first segment of said hinge relative said second segment of said hinge.

8. The grasping tool of claim 1 wherein
   said first lever comprises a handle which a user may use to lift said grasping tool.

9. The grasping tool of claim 8 wherein
   said second lever comprises a handle which may be grasped by a user,
   said handle of said second lever spaced apart from said handle of said first lever a distance spannable by a user's hand where said grasping tool is at rest.

10. The grasping tool of claim 1 wherein
    each of said first plate and said second plate has mutually opposing inner faces,
    a multiplicity of sharp projections extends from the inner face of each of said first plate and said second plate,
    each of said projections is inclined toward said hinge,
    said hinge is an elongate cylinder having a first segment and a second segment,
    the first segment axially rotatable relative to the second segment,
    said hinge having a spring mounted therewithin to resist axial rotation of said first segment of said hinge relative said second segment of said hinge, said first lever comprises a handle which a user may use to lift said grasping tool, said second lever comprises a handle which may be grasped by a user, said handle of said second lever spaced apart from said handle of said first lever a distance spannable by a user's hand where said grasping tool is at rest.

11. A grasping tool for detachable mounting to a carton comprising a first plate having a free end and an opposing end, a second plate having a free end and an opposing end, the opposing ends of each of said first plate and said second plate fixed to a cylindrical hinge, said cylindrical hinge having an axis and including a spring to resist axial rotation of said hinge in a single direction, said first plate and said second plate separated by an acute angle when said hinge is at rest, a first handle fixed to and extending from said first plate, a second handle fixed to and extending from said second plate, each of said first handle and said second handle separated a distance spannable by a user's hand when said hinge is at rest, said first plate and said second plate angularly rotatable about said axis of said hinge against bias of said spring.

12. The grasping tool of claim 11 wherein each of said first plate and said second plate having an inner face, each inner face opposing the other inner face when said grasping tool is at rest, each inner face having a plurality of sharp projections extending therefrom, each projection inclined toward said hinge, whereby said projections will penetrate the skin of the sidewalls of a carton when said inner faces of said plates are abutted to the sidewalls of the carton.

\* \* \* \* \*